Nov. 27, 1951  C. P. ROBERTSON  2,576,194
FOLDABLE COMB
Filed April 28, 1950
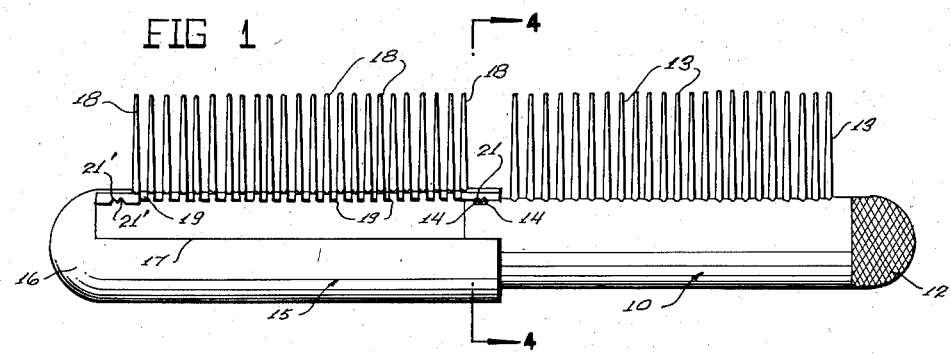
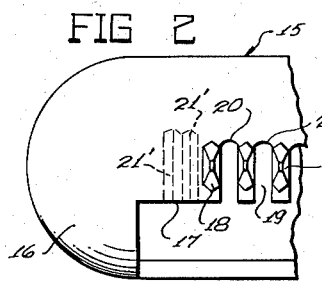
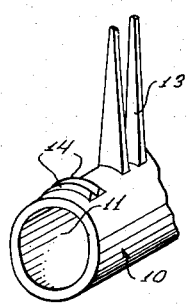
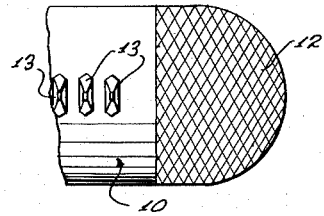
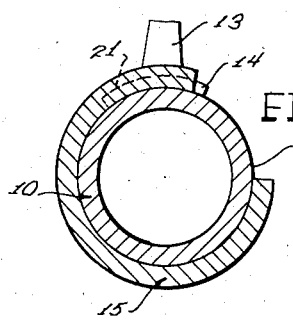
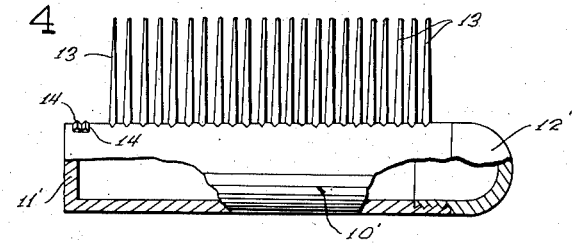
INVENTOR
CLIFFORD P. ROBERTSON
BY
McMorrow, Berman + Davidson
ATTORNEYS Patented Nov. 27, 1951

2,576,194

UNITED STATES PATENT OFFICE 2,576,194

FOLDABLE COMB

Clifford Parker Robertson, San Diego, Calif.

Application April 28, 1950, Serial No. 158,699

3 Claims. (Cl. 132—15)

My invention relates to a foldable comb.

A primary object of the invention is to provide a foldable or collapsible comb designed so as to occupy less space in handbags, pockets and the like.

A further object of the invention is to provide a foldable comb wherein the teeth of the comb interlock when the comb is folded to prevent the collection of dirt between the teeth, and thus facilitate keeping the comb clean.

A still further object of the invention is to provide a comb of the above-mentioned character which is highly simplified, compact, sturdy and durable in construction and neat and attractive in appearance.

Other objects and advantages of the invention will be apparent during the course of the following description.

In the accompanying drawings forming a part of this application, and in which like numerals are employed to designate like parts throughout the same:

Figure 1 is a side elevational view of a foldable comb embodying my invention and showing the same in the extended or open position;

Figure 2 is an enlarged fragmentary plan view of the left-hand end of the comb illustrated in Figure 1;

Figure 3 is a similar view of the right-hand end of the comb illustrated in Figure 1;

Figure 4 is a transverse vertical sectional view taken on line 4—4 of Figure 1;

Figure 5 is a fragmentary perspective view of the inward end of the right-hand comb section;

Figure 6 is a side elevational view of the comb in the folded or closed position; and Figure 7 is a side elevational view of a right-hand comb section embodying a slight modification of the invention.

In the drawings, where, for the purpose of illustration, is shown a preferred embodiment of the invention, the numeral 10 designates a first or inner cylindrical tubular comb section which may have its inner end open, as shown at 11, and preferably includes an outer spherically curved or rounded end 12 which is suitably roughened or knurled, as shown, to facilitate manipulating the comb section 10. The inner comb section 10 is provided upon one side with a longitudinal row of equi-distantly spaced comb teeth 13 arranged at right angles to the longitudinal center line of the comb section 10 and projecting laterally beyond the side of the comb section, as shown. The opposite end teeth of the row of teeth 13 are spaced longitudinally inwardly of the opposite ends of the inner comb section 10. The comb section 10 is further provided adjacent to its inner end with raised locking screw-threads 14 extending about a portion only of the outer surface of the inner comb section 10.

A companion outer cylindrical tubular comb section 15 is provided, and this comb section has its inner end open for telescopically receiving the inner cylindrical comb section 10 therein, as shown. The opposite or outer end of the outer comb section 15 is preferably spherically curved or rounded, as at 16, and the outer comb section 15 is provided in its side wall with a wide longitudinal opening or slot 17 extending throughout substantially the entire length of the outer comb section and through its open inner end. As shown clearly in Figure 4, the opening or slot 17 extends about substantially one quadrant of the circumference of the outer cylindrical comb section 15. The outer comb section 15 is provided adjacent to one side edge of the slot 17 with a longitudinal row of longitudinally spaced comb teeth 18 which extend at right angles to the longitudinal center line of the comb section 15 and laterally beyond the side of the comb section as shown. The opposite end teeth 18 of the row of teeth are spaced longitudinally inwardly of the opposite ends of the outer comb section 15, and the outer comb section is further provided between each adjacent pair of teeth 18 and in the adjacent longitudinal edge of the slot 17 with longitudinally spaced transverse openings or notches 19.

As best shown in Figure 2, the notches 19 are somewhat elongated about the circumference of the cylindrical comb section 15, and the inner rounded ends 20 of the notches 19 are arranged in longitudinal alignment adjacent to one side of the longitudinal row of teeth 18. The openings or notches 19 are wide enough to receive therein the comb teeth of the inner comb section 10 when the comb is collapsed or folded. The outer comb section 15 has the same number of notches 19 as there are teeth 13 on the inner comb section 10. The outer tips or points of the comb teeth 13 and 18 terminate at the same radial distance from the longitudinal center line of the comb, the comb teeth 13 being necessarily slightly longer than the teeth 18, since the inner comb section 10 is smaller in diameter than the outer comb section 15.

The outer comb section 15 is provided on the inner side of its side wall and near its opposite ends with outer and inner sets of internal locking screw threads 21 and 21' respectively, which extend about a portion only of the circumference of the cylindrical comb section 15. The circumferential length of the raised locking screw-threads 14 on the inner comb section is slightly less than the width of the slot or opening 17, so that the screw-threads 14 may pass through the slot 17 when the comb sections 10 and 15 are telescoped for folding and opening the comb.

In use, the comb may be conveniently carried in the pocket, or in a pocketbook or the like while in the folded or collapsed position, Figure 6. When it is desired to open or extend the comb to its position of Figure 1, it is merely necessary to grasp the knurled end 12 and rotate the inner comb section 10 slightly until the locking threads 14 disengage from the outer internal threads 21 adjacent to the outer end 16 of the outer comb section. This places the locking threads 14 and row of comb teeth 13 within the longitudinal slot 17, so that the inner comb section 10 may be pulled axially out of or away from the outer comb section 15. When the comb sections are fully extended, Figure 1, the locking threads 14 register with the inner external threads 21' adjacent to the open end of the outer comb section 15, and the comb section 10 can be rotated clockwise slightly, so that the threads 14 will engage the inner threads 21'. The arrangement is such that when the comb sections 10 and 15 are extended and the threads 14 are fully engaged with the threads 21', the row of comb teeth 13 will be in longitudinal alignment with the row of teeth 18 for forming a substantially continuous longitudinal row of comb teeth.

To collapse or close the comb, the inner comb section 10 is turned counterclockwise until the threads 14 disengage the threads 21' at the open end of the comb section 15, and the comb section 10 may then be telescoped into the outer comb section 15, the threads 14 and teeth 13 passing through the longitudinal slot 17. When the two comb sections are fully telescoped, the threads 14 will register or line up with the outer internal threads 21 of the outer comb section, and the comb teeth 13 will register with the notches 19 between the comb teeth 18. The inner comb section 10 can then be turned clockwise, so that the threads 14 will interlock with the outer internal threads 21. When this occurs, the comb teeth 13 of the inner comb section pass into the notches 19 and contact their ends 20, so that the teeth 13 and 18 interlock or interfit, as shown in Figure 6.

The foldable comb is highly compact, simplified and sturdy and durable in construction. The interfitting of the comb teeth 13 and 18 tends to prevent dirt from collecting between the comb teeth, and makes the comb substantially self cleaning. Also, when the comb is collapsed or folded, Figure 6, so that the comb teeth 13 and 18 interfit, it may be used as a "fine tooth" comb instead of as a regular comb, as shown in Figure 1. The comb is neat and attractive in appearance, and may readily be made in various desirable colors. It is very easily to manipulate for opening and closing the same, and should be quite inexpensive to manufacture.

In Figure 7, the numeral 10' designates a slightly modified form of inner comb section having a closed inner end 11' and removable screw-threaded, outer end cap 12'. All other parts of the comb section 10' are identical with corresponding parts of the comb section 10. With the construction of Figure 7, the comb section 10' constitutes a handy container for ladies' hairpins and the like.

It is to be understood that the form of the invention herewith shown and described is to be taken as a preferred example of the same, and that various changes in shape, size and arrangement of parts may be resorted to without departing from the spirit of the invention or the scope of the subjoined claims.

Having thus described my invention, I claim:

1. In a foldable comb, an outer tubular section, an inner section telescoped in said outer section, said inner section being axially rotatable and longitudinally slidable relative to said outer section, a row of comb teeth on the exterior of and extending longitudinally of each of said sections, said inner section being arranged to have a major portion of the length thereof positioned within said outer section in the closed position of the comb and to have a major portion of the length thereof positioned outwardly of said outer section in the open position of the comb with its row of teeth in endwise relation to the teeth on the outer section, inner and outer internal detent elements in the interior of said outer section at the opposite ends thereof, an external detent element at the inner end of said inner section, said external detent element being releasably engageable with said outer internal detent element in the closed position of said inner section and releasably engageable with said inner internal detent element in the open position of said inner section, said outer comb section being formed with opening means enabling passage of the row of comb teeth on said inner section into side-by-side relation to the row of comb teeth of the outer section as the inner section is moved into the outer section into closed position.

2. In a foldable comb, an outer tubular section, an inner section telescoped in said outer section, said inner section being axially rotatable and longitudinally slidable relative to said outer section, a row of comb teeth on the exterior of and extending longitudinally of each of said sections, said inner section being arranged to have a major portion of the length thereof positioned within said outer section in the closed position of the comb and to have a major portion of the length thereof positioned outwardly of said outer section in the open position of the comb with its row of teeth in endwise relation to the teeth on the outer section, inner and outer internal detent elements in the interior of said outer section at the opposite ends thereof, an external detent element at the inner end of said inner section, said external detent element being releasably engageable with said outer internal detent element in the closed position of said inner section and releasably engageable with said inner internal detent element in the open position of said inner section, said outer comb section being formed with opening means enabling passage of the row of comb teeth on said inner section into side-by-side relation to the row of comb teeth of the outer section as the inner section is moved into the outer section into closed position, said outer comb section being formed with notches opening into said opening means and positioned between adjacent teeth of its row of comb teeth into which the teeth of the row on the inner section can be positioned by rotating said inner section relative to said outer section while the inner section is in its closed position so as to locate the teeth of the inner section between and in line with teeth of the outer section.

3. In a foldable comb, an outer tubular section, an inner section telescoped in said outer section, said inner section being axially rotatable and longitudinally slidable relative to said outer section, a row of comb teeth on the exterior of and extending longitudinally of each of said sections, said inner section being arranged to have a major portion of the length thereof positioned within said outer section in the closed position of the comb and to have a major portion of the length thereof positioned outwardly of said outer section in the open position of the comb with its row of teeth in endwise relation to the teeth on the outer section, inner and outer internal detent elements in the interior of said outer section at the opposite ends thereof, an external detent element at the inner end of said inner section, said external detent element being releasably engageable with said outer internal detent element in the closed position of said inner section and releasably engageable with said inner internal detent element in the open position of said inner section, said outer comb section being formed with opening means enabling passage of the row of comb teeth on said inner section into side-by-side relation to the row of comb teeth of the outer section as the inner section is moved into the outer section into closed position, said outer and inner internal detent elements on the outer comb section and said external detent element on the inner comb section consisting of screw-threads extending circumferentially of the sections, the external screw-threads being engageable and disengageable from either of the internal screw-threads by rotating the inner comb sections in opposite directions relative to the outer comb section, with the inner section in an appropriate open or closed position.

CLIFFORD PARKER ROBERTSON.

REFERENCES CITED

The following references are of record in the file of this patent:

UNITED STATES PATENTS

| Number | Name | Date |
|---|---|---|
| 780,540 | Thomas | Jan. 24, 1905 |
| 1,572,399 | Lewis | Feb. 9, 1926 |
| 2,535,797 | Isbell | Dec. 26, 1950 |